United States Patent [19]

Zielke

[11] 3,724,771

[45] Apr. 3, 1973

[54] HUB-PLATFORM ASSEMBLY AND LOOP-SIZING METHOD

[75] Inventor: Darrell W. Zielke, Valencia, Calif.

[73] Assignee: Superscope, Inc., Sun Valley, Calif.

[22] Filed: Mar. 12, 1971

[21] Appl. No.: 123,689

[52] U.S. Cl. ..........................242/55.19 A, 242/71.8

[51] Int. Cl. ..........................................B65h 17/48

[58] Field of Search.....242/55.19 A, 71.8, 71.9, 197, 242/198, 199, 200; 179/100.2 Z

[56] References Cited

UNITED STATES PATENTS 3,350,028 10/1967 Lear..................................242/71.8

FOREIGN PATENTS OR APPLICATIONS 290,879 6/1971 Austria........................242/55.19 A 42/20676 2/1967 Japan ..........................242/55.19 A

*Primary Examiner*—Billy S. Taylor

*Attorney*—Fulwider, Patton, Rieber, Lee & Utecht

[57] ABSTRACT

A hub-platform assembly for a continuous loop magnetic tape cartridge in which the hub is mounted on the platform for indexing between angularly spaced winding and stripping positions and for axial movement through a preselected movement as a result of said indexing, initially being held releasably in the winding position for loading with a tape pancake which is wound around a conical surface tapering toward the platform. When the hub is indexed to the stripping position, the conical surface is shifted axially to move the larger section thereof, which determined the inside diameter of the pancake, out of the pancake, thereby forming a gap between the hub and the inside diameter permitting the tape to be wound down around the hub by pulling the opposite ends of the tape away from the pancake. The gap size is calculated to produce a loop of predetermined length as this is done.

23 Claims, 11 Drawing Figures

INVENTOR.
DARRELL W. ZIELKE
BY Fulwider, Patton, Rieber, Lee, and Utecht
ATTORNEYS INVENTOR.
DARRELL W. ZIELKE
BY Zulwider, Patton, Rieber, Lee, and Utecht
ATTORNEYS

HUB-PLATFORM ASSEMBLY AND LOOP-SIZING METHOD

BACKGROUND OF THE INVENTION

This invention relates to the winding of a length of tape into an annular roll, or so-called "pancake," on a core assembly, and has particular reference to the winding of magnetic recording tape onto a hub and the joining of the opposite end portions of the tape together into a loop to form an endless tape.

This type of endless tape pancake assembly is used in single-reel, continuous loop, magnetic tape cartridges in which the hub is rotatably mounted on the spindle of a cartridge and the loop between the inner and outer turns of the roll is guided within the cartridge along a preselected path extending from the inner winding away from the roll, then along slots in one side of the cartridge permitting access of the tape player to the tape, then around a pinch roller, and finally back to the outer winding of the roll. The general arrangement of parts of such a cartridge is well known in the art, and is described herein only for background purposes. During operation with such a cartridge, the tape thus can be drawn off one side of the roll, passed around the loop and through the playing portion of the cartridge, and then wound back onto the opposite side of the roll.

It is well known that the operating life of this type of cartridge is dependent upon the loop size formed during manufacture of the cartridge. Too large a loop adversely affects the take-up characteristics of the cartridge, and too small a loop inhibits the operating freedom and results in high tape wear, short life, and generally poor performance. Accordingly, careful attention is given to loop sizing during manufacture, a different loop size being used for each different footage of tape, to provide the proper initial loop length, part of which is distributed within the cartridge to provide inter-layer space the first time the cartridge is run.

In the past the most widely used procedure for forming the loop for such cartridges has involved the unwrapping of a selected length of tape from the inner side of the roll after the latter is wound under selected and controlled tension on a hub mounted on a platform which cooperates with the core in holding the tape in the roll as it is wound. Typically, the roll is first wound on the core with the inner end portion of the tape held in an accessible position so it can be pulled out later. Then the opposite ends sometimes are gripped together and pulled away from the roll until the looseness has been removed, and the outer end portion then is unwound to a preselected length.

After this has been done, the inner end portion is unwound manually until it is about the same length as the outer end portion, and the two ends are spliced together. Then it usually is necessary to shorten the loop to some extent by pulling additional tape from the inside diameter of the roll while winding the tape back onto the outside diameter.

This approach and its variations have several inherent disadvantages, including lack of precise control of the amount of tape that is stripped off the roll by the initial tightening, and also during unwinding of tape from the inside of the roll. More importantly, the required unraveling of tape from the inside of a tightly wound roll often crimps, ruffles or creases the tape, with later adverse effects on performance. In an attempt to minimize this, winding torques have been limited to relatively low levels, and most hubs have been formed with conical winding surfaces (or other generally similar shapes) tapering inwardly toward the platform so that a clearance is provided inside the roll, permitting the tape to curl and turn as it slips along the conical surface. This has been only partially successful, however.

Moreover, the need for manual manipulation and the inherent lack of precise control over lengths of tape stripped from the roll have prevented full automation of the winding, loop-sizing and splicing procedures. As a result, these procedures require a substantial amount of hand labor and thus are relatively expensive.

SUMMARY OF THE INVENTION

The present invention resides in an improved hub-platform assembly for use in winding tape into an annular pancake or roll and thereafter permitting a preselected loop length to be formed in a quick and simple operation without many of the disadvantages of prior assemblies. The invention also resides in the winding and loop-forming method practiced with the hub-platform assembly of the invention.

As illustrated in the preferred embodiment of the invention shown herein, the novel assembly comprises a hub about which the tape is to be wound and having axially spaced winding surfaces of different sizes, a platform at one end of the hub, and means mounting the hub on the platform for selective axial movement from a winding position to a stripping position. In the winding position, the larger winding surface is located to determine the initial inside diameter of the roll of tape that is formed, and after the hub is shifted to the stripping position, the smaller winding surface is moved into position to determine the inside diameter. This forms an annular gap between the hub and the tape roll that has been wound thereon, the gap having a radial width that is determined by the difference in size between the two-winding surfaces. Accordingly, the inner end portion can be drawn freely off the inside diameter of the roll without danger of ruffling or the like, and the amount of tape that is drawn out by pulling on the opposite end portions of the tape is directly related to the width of the gap.

More specifically, the hub herein is formed with a conical outside surface tapering toward the platform (the winding surfaces of different sizes being axially spaced sections of this conical surface), and is mounted on the platform for rotary movement, or indexing, between two angularly spaced positions and for simultaneous axial movement as an incident to such indexing. The mounting means hold the hub releasably in the winding position, guide the hub to the stripping position during indexing, and then lock the hub in the stripping position, which becomes the operating position of the hub in eventual use.

After formation of the gap in the foregoing manner, the opposite end portions of tape are pulled out to wind the roll down about the hub until the roll again becomes tight. Thus, the loop length is automatically determined by the width of the gap, and this eliminates the need for manual trimming, size adjustment and the like. As a result, it is possible to automate the entire operation. Moreover, a wider range of winding torques may be used because crimping and ruffling of the tape no longer is a problem, and the ability to use increased winding torque makes it possible to wind at higher speeds.

Other objects and advantages of the invention will become apparent from the following detailed description, taken in conjunction with the accompanying drawings.

DETAILED DESCRIPTION

Figures 8, 9, 10:
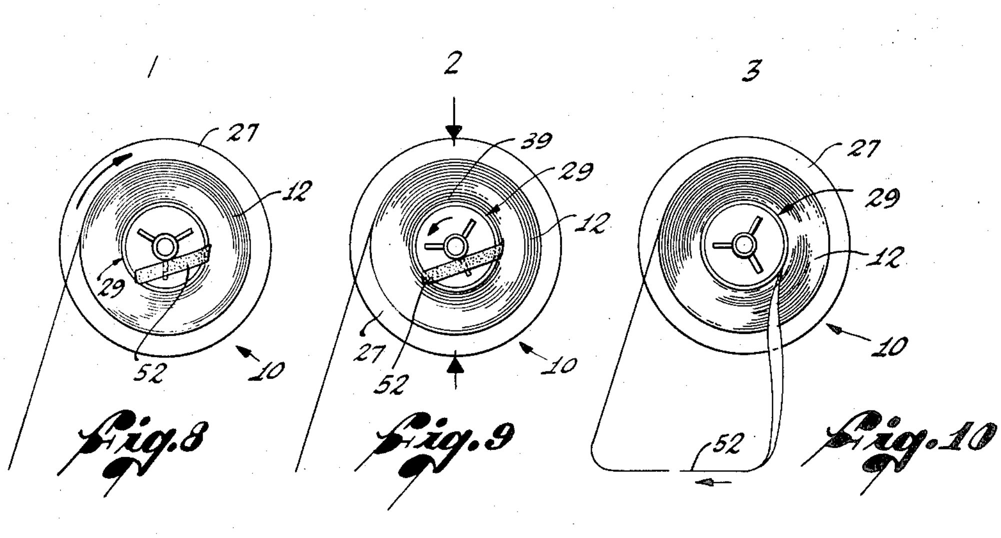
FIGS. 8 through 11 are somewhat schematic plan view of the hub-platform assembly illustrating the winding of tape on the hub, the shifting of the hub to form the gap, the pulling out of the tape ends, and the splicing of the ends into a loop.

As shown in the drawings for purposes of illustration, the invention is embodied in hub-platform assembly, indicated generally by the reference number 10, installed in a conventional cartridge 11 (FIG. 1), and supporting a pancake or roll 12 of magnetic recording tape having its opposite end portions extending off the inner and outer sides of the roll and joined together to form a loop 13. Thus, the length of tape is formed into a so-called continuous loop tape adapted to be unwound from one side of the roll and played in a tape player (not shown) while being simultaneously wound back onto the other side of the roll.

Figures 1, 2, 3, 11:
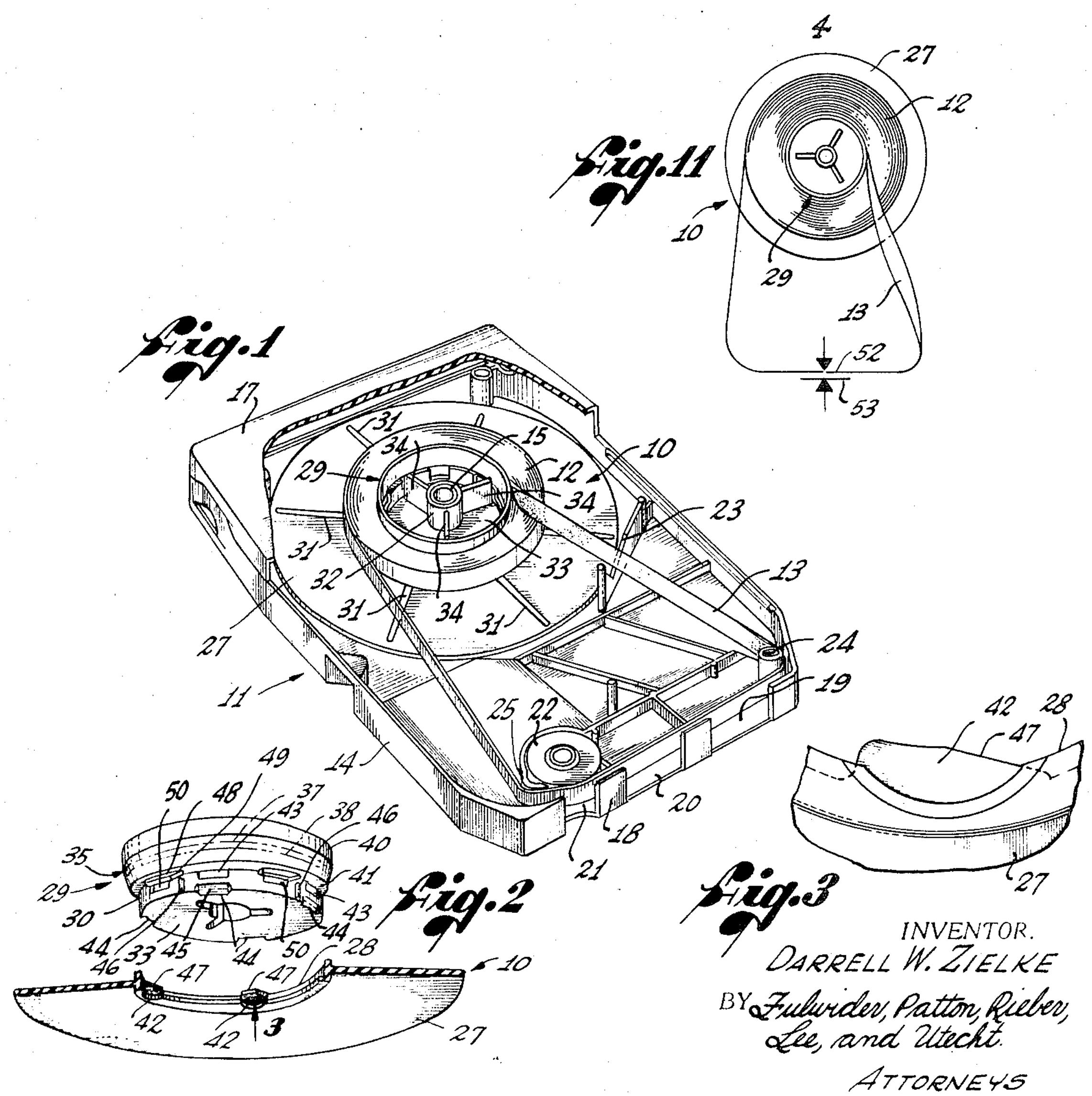
FIG. 1 is a perspective view of a tape cartridge having a hub-platform assembly embodying the novel features of the present invention, and having a length of tape wound thereon and formed with a loop in accordance with the method of the invention, part of the cover of the cartridge being broken away and shown in cross-section.
FIG. 2 is an enlarged, exploded perspective view of the hub-platform assembly of FIG. 1, the platform being shown partly in cross-section.
FIG. 3 is an enlarged fragmentary view of the portion of FIG. 2 indicated by the arrow 3 therein.

The illustrative cartridge 11 comprises a base 14 having a centrally mounted, upstanding spindle 15 for rotatably supporting the hub-platform assembly 10 in the cartridge, and a cover 17 that snaps onto the base to enclose the hollow interior of the cartridge. Formed on one sidewall 18, the lower right or front sidewall in FIG. 1, are three slots 19, 20 and 21 across which the loop 13 is guided in the cartridge. These slots permit access by the capstan and the transducer head of the player, a pinch roller 22 being journaled in the cartridge inside the slot 21 with the tape extending between the roller and the slot to be pinched between the roller and the capstan, thereby to drive the tape.

It can be seen in FIG. 1 that the tape comes off the inner side of the roll 12 and extends forwardly across a ramp 23 to a guide post 24, around which it turns to extend across the front sidewall 18 to the pinch roller 22. Then the tape turns around this roller and a guide rib 25, and extends rearwardly to the roll, winding back onto the outer side thereof.

The hub-platform assembly 11 generally comprises a disk-like platform 27 having a circular center hole 28, and a hub 29 of circular cross-section having one end portion 30, the lower end portion in the drawings, fitted into the center hole and an opposite end portion projecting upwardly from the platform. The tape is wound around this upper end portion with the lower edge of the tape in engagement with the upper side of the platform, which thus forms a peripheral flange around the hub to hold the lower edge of the tape generally in a plane normal to the axis of the hub as the roll or pancake is wound on the assembly. A plurality of angularly spaced radial ribs 31 preferably are formed on the upper side of the disk with outwardly and downwardly inclined upper surfaces for engaging the tape and holding it away from the flat inner side of the disk.

Formed in the center of the hub 29 is a sleeve 32 (FIG. 1) which projects upwardly from a lower end wall 33 of the hub and is reinforced and braced by spokes 34. As shown in FIG. 1, the spindle 15 of the cartridge 11 projects upwardly into the sleeve 32 to support the assembly rotatably in the cartridge.

In accordance with the present invention, the hub 29 is formed with an outside surface 35 about which the tape is wound, and having two axially spaced winding surfaces 37 and 38 of different sizes, and is mounted on the platform 27 for selective axial movement from a winding position in which the larger surface 37 is positioned to determine the initial inside diameter of the roll 12, to a stripping position in which the smaller surface 38 is positioned to determine the inside diameter, the larger surface being shifted out of the roll as an incident to such movement. Thus, the tape may be wound about the larger surface, and the hub then may be shifted to the stripping position to create a gap 39 of selected size between the hub and the inside of the roll. This gap permits the tape to be wound down about the hub by pulling out the ends of the tape. As this is done, the opposite end portions of the tape are extended a predetermined amount determined by the radial width of the gap, which thus determined the eventual loop length of the tape.

In this instance, a conventional conical winding surface 37 is utilized in the preferred embodiment of the invention, tapering downwardly toward the platform 27 from a cylindrical flange 40 constituting the upper end of the hub, to a peripheral annular shoulder 41 joining the conical portion to a cylindrical base which forms the end portion 30 of the hub. This base, which herein is composed of resiliently flexible plastic, is disposed in the center hole 28 of the platform 27 with a snug but rotatable fit. Accordingly, the two axially spaced winding surfaces 37 and 38 herein are axially spaced sections of the conical surface 35, for engaging the upper edge portion of the inside turn of the tape and thus determining the inside diameter in the two positions of the hub.

The angle of the conical surface 35 (which may be more completely described as frustro-conical) is not critical, by typically should be on the order of 20 to 30°. It will be understood, however, that this angle should be correlated with the increment of axial movement of the hub 29 between its two positions in order to determine the radial width of the gap 39 created by such movement.

Figure 4:
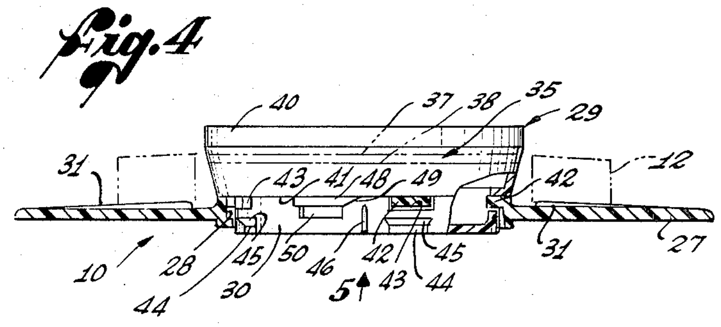
FIG. 4 is an enlarged cross-sectional view of the hub-platform assembly, taken substantially along the line 4—4 of FIG. 5 with the hub in the winding position.

As shown most clearly in FIGS. 2 through 4, the means for mounting the hub 29 on the platform 27 includes, in addition to the cylindrical base 30 and the center hole 28, a plurality of inwardly extending tabs or fingers 42 spaced angularly around the center hole, and a corresponding number of similarly spaced detent recesses in the form of slots 43 in the base 30 spaced upwardly from the lower end of the base and herein immediately beneath the shoulder 41. The hub 29 thus may be positioned over the center hole 27 with the fingers 42 angularly aligned with the slots 43, as shown in FIG. 2, and then pressed downwardly into the center hole.

Notches 44 are formed around the lower end of the base 30 to receive the fingers 42 as the base enters the center hole 28, and have upwardly and outwardly inclined cam surfaces 45 which assist in guiding the fingers into the slots and deforming the base as the latter is pressed into the platform 27. When the fingers become axially aligned with the slots 43, they snap into the slots and thereafter hold the hub on the platform in the manner shown in FIG. 4, this being the winding position in which the shoulder 41 abuts against the platform and the larger section 37 of the winding surface 35 is positioned for engagement with the tape as the latter is wound initially into the pancake 12.

Figure 5:
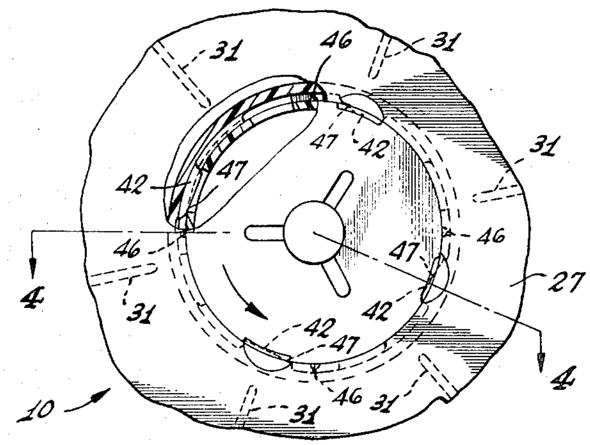
FIG. 5 is a fragmentary plan view of the assembly of FIG. 4, partly broken away and shown in cross-section.

As shown in FIGS. 2, 3 and 5, one side 47 of each finger 42 is formed as an inclined cam which faces toward the adjacent end wall of the associated detent slot 43, all of these cams facing in the same direction so as to move upward, and into engagement with, the adjacent end walls of the slots during relative rotation of the hub 29 and the platform 27 in one direction. Herein, the hub is designed to be turned counterclockwise as viewed from the bottom of FIG. 5, and the cams are the leading edges of the fingers during such turning.

Thus, the inclined cams 47 engage the slot ends and cooperate therewith in forcing the fingers 42 out of the detent slots 43 and into sliding engagement with the cylindrical outer surface of the base 30 immediately beneath the downwardly facing annular shoulder 41, which serves as a positioning guide for the fingers. To effect the axial shifting of the hub relative to the platform during this rotary movement, a plurality of wedge-shaped cams 48 are formed beneath the shoulder 41, one between each pair of detent slots 43, with downwardly inclined ramps 49 facing toward the slots for engagement with the fingers as they slide around the base.

These ramps 49 cam the fingers 42 downwardly relative to the hub 29, simultaneously camming the hub upwardly relative the platform 27 through a selected increment of axial movement equal to the axial width of the ramp. This is shown, greatly magnified, in FIG. 7. Axial ribs 46 on the base insure that the fingers 42 remain close to the ramps 49 during this movement.

Figure 6:
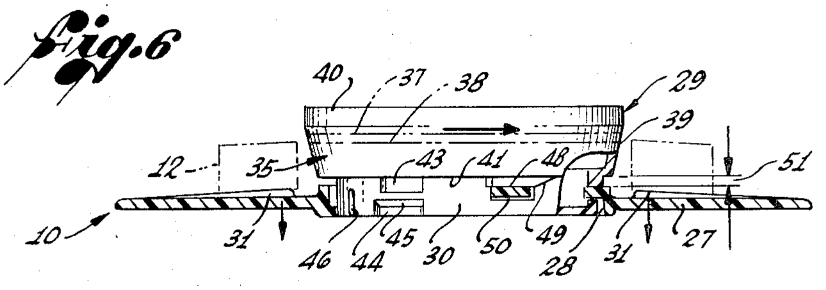
FIG. 6 is a view similar to FIG. 4 with the hub in the stripping position.
Figure 7:
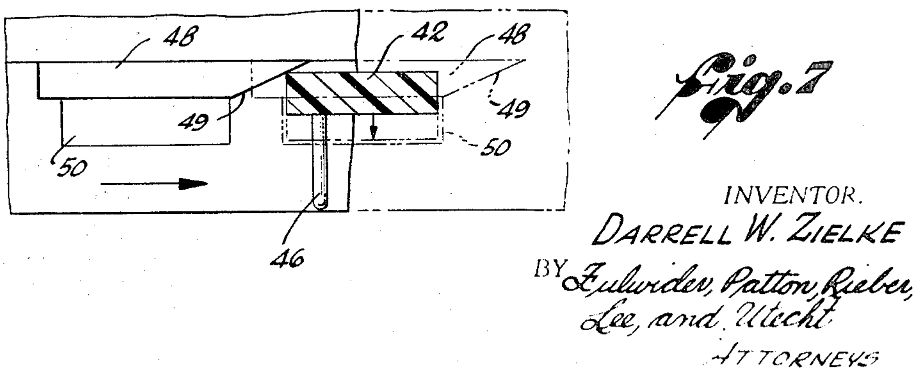
FIG. 7 is an enlarged fragmentary view of parts of FIGS. 4 and 6 illustrating the movement of these parts as the hub is shifted to the stripping position.

After the fingers 42 reach the lower ends of the ramps 49, they slide along the undersides of the cams 48 into angular alignment with, and snap into, a second set of detent recesses in the form of slots 50 in the base 30 immediately beneath, and angularly aligned with, the cams, so as to alternate angularly in axially offset relation with the slots 43. When this occurs, the hub 29 has been shifted to the stripping position, as shown in FIG. 6, and is securely held in this position by the interfitting fingers 42 and slots 50. The dotted and full-line positions of the parts in FIG. 7 illustrate the movement of a finger 42 along a ramp 49 and into a slot 50.

By comparing FIGS. 4 and 6, it can be seen that the hub 29 has been moved axially, during the rotary indexing movement, through an increment 51 (FIG. 6) evidenced by the spacing of the shoulder 41 above the top of the platform 27. The gap 39 thus produced between the winding surface 35 and the inside diameter of the tape pancake 12 is determined by the diameter difference along the conical surface at levels 37 and 38 spaced apart a distance equal to increment of axial feed, and thus is dependent upon the angle of the conical surface.

FIGS. 8 through 11 illustrate successive steps in the winding of the tape on the novel hub-platform assembly 10 and forming a loop 13 of preselected length. As shown in FIG. 8, the tape is wound onto the hub 29 after lapping the inner end portion 52 over the upper end for ease of later access, and with the hub in the winding position, that is, with the fingers 42 in the slots 43 along the shoulder 41 at the upper end of the base 30. Thus, the upper edge of the inside turn or wrap of the tape engages the winding surface 35 around the larger section 37, and the initial inside diameter is determined by this larger section.

After the desired length of tape has been wound onto the pancake 12, the hub-platform assembly 10 is gripped in any convenient manner and the hub 29 is indexed counterclockwise relative to the platform 27, thereby shifting the fingers 42 out of the slots 43, along the ramps 49, and into the slots 50, thereby shifting the hub to the stripping position (FIG. 9). This produces the gap 39 between the inside diameter of the pancake 12 and the winding surface 35 by shifting the larger section 37 out of the pancake and moving the smaller section 38 into the position originally occupied by the larger section, axially aligned with the upper edge of the tape.

Then the two ends of the tape can be gripped, either manually or by machine elements (not shown), and pulled away from the pancake 12, which winds down about the hub 29 until the gap 39 is taken up and the pancake again becomes tight, but not around the section 38. When this has been done (FIG. 10), the tape ends are fitted together and spliced, typically by being butted together and joined by a piece of splicing tape 53 (FIG. 11). Then the assembly is ready for installation in a cartridge 11 in the usual manner.

As has been stated, this procedure eliminates the danger of crimping, ruffling, or creasing the tape drawn from the inside diameter of the pancake 12, because the tape no longer is clinched against the hub 29 during this operation. A related advantage is the possibility of using increased winding torque, also because the initial tightness of the pancake no longer acts to clinch the inside turn of the tape against the hub. With increased permissible torque, higher winding speeds are possible, and higher winding speeds result in increased production capability.

In addition, the amount of tape that may be pulled out after production of the gap 39 can be predicted within relatively close limits, thus permitting the hub-platform assembly 10 to be tailored to suit different loop-length requirements. To this end, the amount of loop tail increase per turn of the tape in the pancake 12, with a given gap 39, is calculated, and this increase is multiplied times the number of turns or wraps of the tape in the pancake to determine the total loop tail increase.

More specifically, the following equation may be used to determine the loop tail increase per turn of the tape:

$$\Delta X = \pi (d + \Delta D) - \pi d$$

where $\Delta x$ is loop tail increase per turn;

$d$ is the final inside diameter; and $\Delta D$ is the inside diameter change.

Thus, with a given increment of diameter change ($\Delta D$), it is possible to solve the equation for the loop tail increase per turn ($\Delta X$).

The calculation of the number of wraps of tape in a pancake is accomplished with the following equation as a starting point for determining the thickness of the pancake obtained with a given footage of tape:

$$F = ( r_2^2 - r_1^2 )/12\, t\, \pi$$

where $F$ is the total footage of tape to be wound in the pancake;

$t$ is the thickness of the tape $r_2$ is the outside radius of the pancake; and $r_1$ is the inside radius of the pancake.

A typical tape thickness is 0.0013 of an inch. Thus, with a known footage and thickness of tape, the equation can be solved for the thickness or radial width of the pancake ($r_2 - r_1$).

Then, with a known tape thickness ($t$), the following equation gives the number of wraps ($W$):

$$W = r_2 - r_1/t$$

It should be noted that air boundary layers within the pancake require the addition of a small factor, the magnitude of which will be indicated by experience with the procedure. Accordingly, the loop size may be automatically built into the assembly, rather than being left for the manual sizing operation presently in wide use in the industry.

It should be noted that the two-piece hub-platform assembly 10 of the invention has the additional advantage of permitting economy in the selection and use of materials. The hub 29 should be molded of plastic such as an acetal copolymer or homopolymer, presently used for the entire assembly. This type of material provides good dimensional consistency and resilience, and has good bearing qualities and a low coefficient of friction, but is relatively expensive. The platform 27, on the other hand, may be made of less expensive plastic such as polystyrene, since high bearing qualities and the like are not required in the platform. Accordingly, the use of relatively expensive, resilient material may be limited to the hub, and a less expensive, more rigid material used for the platform. This results in a materially less expensive hub-platform assembly that may be mass-produced at a highly competitive cost, without sacrificing any aspects of performance.

From the foregoing, it will be evident that the present invention provides a new and improved hub-platform assembly 10 and loop-forming method which eliminates the need for the time-consuming and relatively expensive loop-sizing and trimming procedures that heretofore have been required, while also eliminating the danger of ruffling or creasing the tape as it is unwound from the inside diameter of the pancake. Because the loop size may be automatically built into the assembly by correlating the various characteristics of the initial pancake 12 with the size of the gap 39 formed by shifting the hub 29 from the winding position to the stripping position, the invention makes it possible to automate the complete process of loading, loop-sizing and splicing in a relatively simple manner.

It also will be evident that, while a preferred embodiment of the invention has been illustrated and described, various changes and modifications may be made by those skilled in the art without departing from the spirit and scope of the invention.

I claim:

1. A hub-platform assembly for a continuous loop tape cartridge having, in combination:

a platform in the form of a disk having a center hole;

a hub having a cylindrical base end portion composed of resiliently flexible material and fitted rotatably in said center hole, a frustro-conical winding surface tapering toward said base end portion, and an annular shoulder extending from the smaller end of said winding surface to said base end portion, said shoulder being positioned to engage one side of said platform and locate the hub in a winding position;

a first set of angularly spaced slots in said base end portion adjacent said shoulder;

a set of angularly spaced fingers on said platform projecting into said center hole and fitting into said slots to retain said hub releasably in said winding position;

a second set of angularly spaced slots in said base end portion, the slots of said second set being spaced axially from said first set, away from said shoulder, and alternating angularly with the slots of the first set whereby one slot of said second set is disposed angularly between each pair of slots of the first set;

and a set of angularly spaced cams formed on said base section, each cam being positioned between a slot of the first set and a slot of the second set and having an inclines ramp for guiding one of said fingers between the associated slots, whereby the hub is shifted axially relative to the platform from said winding position to a stripping position as it is turned to shift the fingers from the first set of slots, along said ramps and into the second set of slots.

2. A hub-platform assembly as defined in claim 1 further including means for guiding said fingers into said first set of slots as said base end portion is pressed into said center hole.

3. A hub-platform assembly as defined in claim 1 further including cooperating cam surfaces on said first set of slots and said fingers for camming the fingers out of the slots as the hub is turned.

4. A hub-platform assembly as defined in claim 1 in which said hub is composed of resiliently flexible plastic and said platform is composed of more rigid plastic.

5. A hub-platform assembly for use in winding a length of tape into an annular pancake and supporting the pancake as the opposite end portions of the tape are pulled thereform to form a loop, comprising:

a platform in the form of a disk having an annular side for engaging one side of the pancake, and having a center hole encircled by said annular side;

a hub having one end portion fitted rotatably in said center hole and an opposite end portion projecting outwardly from said platform;

said hub having a conical peripheral surface tapering toward said platform, whereby the tape may be wound about the hub with one edge of the tape engaging said platform and the opposite edge portion positioned during winding by a first section of said conical surface spaced axially from said platform a preselected distance equal to the width of the tape;

means holding said hub releasably in a winding position on said platform with said first section spaced said preselected distance from the platform;

means responsive to rotation of said hub relative to said platform to shift the hub axially relative to the platform and move said first section away from the platform, thereby moving a second smaller section of said conical surface into the position originally occupied by said first section and leaving a gap between the conical surface and the tape pancake;

and means responsive to a preselected amount of movement of the hub relative to the platform to secure the hub to the platform against further movement.

6. A hub-platform assembly as defined in claim 5 in which said holding means comprise a first set of recesses angularly spaced around said one end portion of said hub, and a set of fingers on said platform extending inwardly and releasably received in said recesses.

7. A hub-platform assembly as defined in claim 6 in which said fingers and said recesses have cooperating cam surfaces for shifting the fingers out of the recesses as the hub is turned in one direction relative to the platform.

8. A hub-platform assembly as defined in claim 6 in which said means responsive to rotation of said hub to shift the hub axially comprise cams on said one end portion having ramps along which said fingers slide, said ramps being inclined across the paths of said fingers during rotation to shift the fingers axially relative to the hub.

9. A hub-platform assembly as defined in claim 7 in which said means responsive to a preselected amount of movement of the hub comprise a second set of recesses spaced angularly and axially from said first set of recesses, at the ends of said ramps, to receive the fingers and secure the hub and the platform in said stripping position.

10. A hub-platform assembly as defined in claim 7 in which said hub has an annular shoulder facing away from said conical surface between the latter and said first set of slots for guiding said fingers to said ramps.

11. A hub-platform assembly for use in winding a length of tape into an annular pancake and thereafter supporting the pancake, comprising:

a disk-like platform for engaging one side of the pancake;

a hub centrally mounted on said platform in a winding position and projecting away from said platform, said hub having a peripheral surface about which the tape is to be wound and having two axially spaced sections of different sizes, the larger of said sizes being spaced from said platform to engage the tape adjacent the side of the pancake remote from the platform, and the smaller of said sizes being disposed between said larger size and said platform;

and means mounting said hub on said platform for selective axial movement relative thereto from said winding position to a stripping position in which said larger section is spaced from said platform a distance greater than the width of said tape, thereby to form a gap between said annulus and said hub.

12. A hub-platform assembly for use in winding a length of tape into an annular pancake and thereafter supporting the pancake, comprising:

a hub having an outside surface about which the tape is to be wound;

a platform disposed adjacent one end of said hub and projecting radially outwardly therefrom to form a peripheral flange about the hub for engaging one edge of the tape as the latter is wound about said hub and one side of the pancake after it is wound about the hub;

and means mounting said hub on said platform for selective axial movement relative thereto from a winding position to a stripping position;

said outside surface of said hub having a first section of preselected diameter in a selected position for engagement with said tape as the latter is wound on said assembly with the hub in said winding position, thereby to form the inner side of said annulus to said preselected diameter, and having a second section of smaller diameter than said first section and axially spaced therefrom, said first section being movable out of the annulus as the hub is moved from said winding position to said stripping position, and said second section being movable into a position to engage the inner side of said annulus as the hub is moved to said stripping position, thereby to form a gap of selected thickness between said hub and the annulus as an incident to such movement.

13. A hub-platform assembly as defined in claim 12 in which said platform is a disk having a center hole, and said hub has a base end fitted into said center hole and movably secured therein.

14. A hub-platform assembly as defined in claim 13 in which said outside surface is frustro-conical and tapers toward said platform, said sections being axially spaced portions of said outside surface.

15. A hub-platform assembly as defined in claim 13 in which said mounting means include two axially spaced sets of detents and coacting fingers acting between said hub and said platform to hold the latter releasably in said winding position and subsequently in said stripping position.

16. A hub-platform assembly as defined in claim 15 in which said detents are two sets of slots formed in said base end, the slots of one set being axially spaced from the slots of the other set, and said fingers being mounted on said platform to project inwardly into said center hole for selective engagement with the slots of the two sets.

17. A hub-platform assembly as defined in claim 16 in which said mounting means also include cam elements for shifting said fingers from one set of slots to the other as said hub is turned relative to said platform.

18. A hub-platform assembly as defined in claim 17 in which said cam elements comprise inclined edges on said fingers for camming the fingers out of one set of slots, and ramps on said base end for guiding the fingers axially into the other set of slots.

19. The method of winding a length of tape into a pancake around a hub mounted on a platform and formed with axially spaced winding surfaces of different sizes, and forming a loop with the opposite end portions of the tape, said method comprising the steps of:

winding the tape around the hub and against the platform with the hub positioned on the platform in a winding position in which the larger of the winding surfaces is located to determine the initial inside diameter of the pancake;

shifting the hub relative to the platform into a stripping position in which the smaller of the winding surfaces is located to determine the inside deameter of the pancake, and thereby forming an annular gap between the hub and the pancake;

winding the tape down about the smaller winding surface as permitted by the gap, while pulling tape from the inner side of the pancake, through the gap;

and joining the opposite ends of the tape together to form a loop.

20. The method defined in claim 19 in which the winding step is performed by pulling both ends of the tape away from the pancake until the latter winds down around the smaller winding surface.

21. The method as defined in claim 19 in which the hub has a conical winding surface, and said larger and smaller surfaces are axially spaced sections of said conical surface, said shifting step being performed by moving the hub axially relative to the platform to move the conical surface axially away from the platform a preselected increment to produce a gap of preselected radial width.

22. The method as defined in claim 19 including the step of initially sizing said pancake, said gap and said winding surfaces relative to each other to produce a loop of predetermined size when said pancake has been wound down against the smaller winding surface.

23. The method of winding a length of tape into a pancake around a hub mounted on a platform and having an outwardly facing winding surface capable of being changed from a preselected first effective size to a smaller, second effective size, and forming a loop with the opposite end portions of the tape, said method comprising the steps of:

winding the tape into the pancake around the hub while the winding surface has said preselected first effective size;

changing the winding surface to aid smaller, second effective size, and thereby forming an annular gap between the hub and the pancake;

winding the tape down about the winding surface to said smaller, second effective size while pulling tape from the inner side of the pancake through the gap;

and joining the opposite ends of the tape together to form the loop.

* * * * *